(12) United States Patent
Lewis et al.

(10) Patent No.: US 7,551,105 B2
(45) Date of Patent: Jun. 23, 2009

(54) VIRTUAL HOST ISOLATION AND DETECTION OF EMBEDDED OPERATIONAL FLIGHT PROGRAM (OFP) CAPABILITIES

(75) Inventors: Robin H. Lewis, Orlando, FL (US); Kenneth E. Williams, Winter Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 470 days.

(21) Appl. No.: 11/289,458

(22) Filed: Nov. 30, 2005

(65) Prior Publication Data

US 2007/0124505 A1    May 31, 2007

(51) Int. Cl.
G08G 5/00 (2006.01)

(52) U.S. Cl. .................. 340/947; 340/945; 340/948; 707/2; 707/4; 709/250

(58) Field of Classification Search ............ 340/947, 340/945, 948; 709/250; 707/2, 4
See application file for complete search history.

(56) References Cited

U.S. PATENT DOCUMENTS

| | | | | |
|---|---|---|---|---|
| 5,034,686 | A * | 7/1991 | Aspelin ................... 324/537 |
| 5,229,538 | A | 7/1993 | McGlynn et al. |
| 5,541,839 | A * | 7/1996 | Mitzkus et al. ............ 244/3.16 |
| 5,548,510 | A | 8/1996 | Ebert et al. |
| 5,591,839 | A * | 1/1997 | Miller et al. ............... 536/23.7 |
| 5,681,008 | A | 10/1997 | Kinstler |
| 5,992,290 | A * | 11/1999 | Quebedeaux et al. ........ 89/1.56 |
| 6,112,569 | A * | 9/2000 | Ossendorf ................. 72/241.8 |
| 6,122,569 | A * | 9/2000 | Ebert et al. ................... 701/3 |
| 6,131,125 | A | 10/2000 | Rostoker et al. |
| 6,360,290 | B1 | 3/2002 | Avritch et al. |
| 6,615,116 | B2 * | 9/2003 | Ebert et al. ................... 701/3 |
| 6,971,090 | B1 | 11/2005 | Gruttadauria et al. |

FOREIGN PATENT DOCUMENTS

WO    WO-99/39268 A1    8/1999
WO    WO-02/10901 A2    2/2002

* cited by examiner

*Primary Examiner*—George A Bugg
*Assistant Examiner*—Edny Labbees
(74) *Attorney, Agent, or Firm*—Birch, Stewart, Kolasch & Birch, LLP

(57) ABSTRACT

The present invention relates to an object oriented architecture that includes a plurality of host aircraft interface objects that enable a plurality of different host aircraft or variants to be attached or interfaced to an associated store, such as a targeting pod or a weapon system. The union of all aircraft hosts and variants are packaged and maintained as one executable capable of adapting to the predetermined suite of identified hosts and host variants. At least one or more interface objects provide a virtual translation layer which is dynamically determined and allocated during instantiation. Auto detection of the host aircraft/host aircraft variant provides the specific interface protocol by which the store can process and provide status via a predetermined signal format.

26 Claims, 6 Drawing Sheets

VIRTUAL HOST ISOLATION AND DETECTION OF EMBEDDED OPERATIONAL FLIGHT PROGRAM (OFP) CAPABILITIES

BACKGROUND OF THE INVENTION

1. Field of the Invention

The present invention relates generally to aircraft stores, and more specifically to a system and method for attaching or interfacing a targeting pod or weapon to different types of host aircraft and aircraft variants using object oriented software.

2. Description of the Related Art

A targeting pod is a device designed for attachment to an aircraft such as a fighter aircraft. Modern targeting pods include high-resolution FLIR devices, dual-mode lasers, CCD-TV, laser spot trackers and laser markers. Targeting pods are designed to detect and identify enemy targets, and provide pointing and range information to the aircraft's weaponry. Targeting pods usually provide automatic tracking and laser designation of targets, and they often provide real-time imagery that is presented on cockpit displays.

A targeting pod, such as the SNIPER XR (eXtended Range), developed by Lockheed Martin, is one of the advanced targeting pods used by the US Air Force on various host aircraft and variants. A host aircraft is generally considered to be a family of aircraft such as the F-16. A variant is considered to be a different version of the same family. For example, an F16 host may contain the following variants: BLK30 SCU5, BLK50 M3+, BLK50 M4 and BLK40 T7. An F15 host also supports a suite of variants, SUITE5 and SUITE4. The SNIPER currently supports eight different host aircraft variants (F16-4 versions, F15-2 versions, A10 and F18 in a single Operation Flight Program ("OFP")). By definition, each variant exhibits a unique signature that can be distinguished by either static protocol or dynamic characteristic. Static protocol is primarily used as the detection discriminator. Typically each interface has a uniquely defined data set (number of messages, size, etc.) that can be queried at instantiation. Some variants are not uniquely defined by static protocol. These variants use data characteristic as a secondary discriminate. A data characteristic can be an observed behavior of an individual data item, such as time tag rollover. Since there are a plurality of different host aircraft and variants, it is often difficult to attach or to interface a targeting pod to more than one type of host aircraft or variant.

Legacy targeting pod systems include LANTIRN, designed by Lockheed Martin, ATFLIR designed by Raytheon and LITENING designed by Northrop Grumman. The known solutions for attaching legacy systems to different host aircraft include "hardware jumpers" or dip switches to identify and detect a unique host. Other approaches have been to "hard code" a variant to only operate on a specific host/variant and not dynamically determine the host/variant. These legacy systems include the disadvantage of needing hardware to either convert a protocol or uniquely identify a host. They may also need to change hardware components or reprogram and the targeting pod or "asset" cannot be quickly moved from host to host which is known as "asset pooling". The legacy systems also cannot provide individualized host compatibility without some form of separate specialized software objects and/or hardware adaptation, and there is an increased product cost resulting from the need for a hardware identifier or individually developed and maintained software objects which are adapted for use with a network protocol, such as the 1553 protocol used by the U.S. military.

MIL-STD-1553 is a military standard that defines a local area network (LAN) originally developed for military aircraft. It is a digital time-division multiplexing network protocol, and it is used when fast, positive control is required. The standard defines the handshaking, data formats and timing requirements of the protocol as well as the electrical characteristics of the bus and the interface electronics of various terminals.

In the military standard, one terminal is designated as the bus controller; and all others are remote terminals each having a specific terminal address. All transmissions are initiated by the bus controller by transmitting a command word. Encoded into the command word are a terminal address, a TR (transmit/receive) bit, a subaddress and a word count. Remote terminals monitor the bus and respond only to commands containing its own terminal address. The remote terminal transmits or receives the specified number of words from/to the specified subaddress. A remote terminal transmits a status word that includes its terminal address before transmitting data words or to confirm reception of data words. Special messages are reserved for broadcast data and mode codes. Words are 16 bits long and are transmitted at one megabit per second. Messages can have up to 32 words.

Targeting pods must exchange application specific messages with the host aircraft, and the messages must be translated for use with the targeting pod software. Targeting pods such as SNIPER have core capabilities that may account for ~95% of the embedded software functionality. The core represents the union of shared targeting capabilities available to any host. Only 5% of the OFP software associated with the SNIPER is dedicated to a unique host and host variant implementations.

In order to exploit the core capabilities of targeting pods, legacy systems have utilized multiple, non-resident software executables to support the interface to multiple host implementations. These legacy solutions are disadvantageous because they require use of multiple embedded OFPs to support all host variants. They increase the cost to develop and integrate new host variants, and they greatly increase the customer's cost of maintaining multiple versions of fielded pods. Lastly, the legacy systems prevent easy migration of core capabilities to future interface protocols, such as Ethernet or Open Systems, without having a shared translation layer from which protocol differences can be transversed.

Accordingly, there is a need for a targeting pod system and method that operates seamlessly with multiple hosts and host variants utilizing a common physical interface protocol to provide host detection, isolation and translation. There is also a need to eliminate hardware signals for host detection and to eliminate multiple OFP executables for interface with variant host applications. There is a need for a targeting pod system and method that will allow for effective asset pooling and reduced costs.

SUMMARY OF THE INVENTION

The method and system of the present invention, provides a targeting pod or other aircraft store with virtual host detection and isolation of embedded OFP capabilities. The present invention also provides a novel approach to detection and isolation of the host aircraft and host attributes from common core capabilities. This invention further provides novel enhancements for the development and production of embedded targeting systems that are required to operate seamlessly on multiple platforms with different virtual interface protocols and interface attributes.

The present invention includes a "plug and play" like capability for embedded targeting applications by adding real-time detection (auto-detect) of the determined host without the aid or need of specific hardware components, and by providing a virtual translation layer which isolates the core system capabilities from the suite of available host formats and characteristics.

There are several major advantages associated with the present invention. The present invention requires no hardware to either convert a protocol or uniquely identify a host. Since there is no need to change any hardware components, the asset can be quickly moved from host to host ("asset pooling") and provide individualized host compatibility. The present invention also reduces product cost by eliminating the need for a hardware identifier. The present invention allows the use of one embedded OFP to support all host variants. It reduces the cost to develop and integrate new host variants. It greatly reduces the customer's cost of maintaining multiple versions of fielded pods. Lastly, the present invention allows for easy migration of core capabilities to other interface protocols such as Ethernet or Open Systems.

DETAILED DESCRIPTION OF THE INVENTION

In order to facilitate the reader's understanding of the present invention, the following list of acronyms and their general meanings are provided:
AC IF—Aircraft Interface
ATFLIR—A targeting pod developed by Raytheon.
CCD-TV—Charged Couple Device Television
CP—Core Pod
FLIR—Forward Looking Infrared Red
INS—Inertial Navigation System
LANTIRN—A Lockheed Martin developed targeting pod.
LITENING—A Northrop Grumman developed targeting pod.
OFP—Operational Flight Program
PVI—Pilot Vehicle Interface
SNIPER—A Lockheed Martin developed targeting pod.

The following list of terms are defined:

A "host aircraft" is defined to be any known family of aircraft.

A "host aircraft variant" is defined to be any existing variation of interface signal protocol to the above-mentioned known family of aircraft.

A "virtual translation layer" is defined to be a plurality of store interface objects utilizing inherited attributes of a parent interface class to isolate host aircraft commands and status from a predefined core store protocol.

An "auto detection scheme" is defined to be a method by which the specific host aircraft and host aircraft variant can be determined.

A "store" is defined to be a targeting pod, a weapon system or other device interfacing to a predetermined suite of host aircraft and host aircraft variants.

An "object" means a self-contained module of data and its associated processing. Objects are the software building blocks of object technology.

"Encapsulation" means the creation of self-sufficient modules that contain the data and the processing (data structure and functions that manipulate that data). These user-defined, or abstract, data types are called "classes."

The term "functionally mapped" means commanded data is translated to a subsystem software module.

The term operational flight program "OFP" is the terminology the U.S. Air Force uses to describe the software programmed into avionics systems. Such software is often reviewed and updated regularly.

Figure 1A:
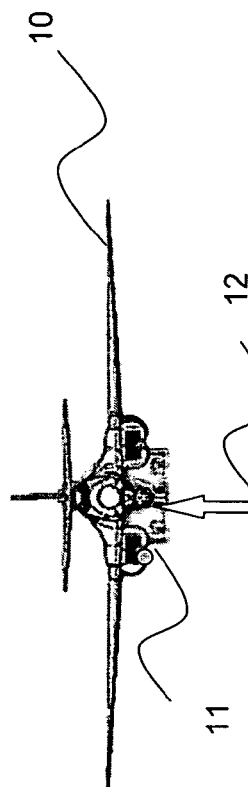
FIG. 1A is an illustration of an aircraft and a targeting pod.

Referring now to FIG. 1A, an illustration of an aircraft 10 having a targeting pod 11 is provided. While the present invention is described in the context of the aircraft 10 and the targeting pod 11, it should be understood that the present invention is applicable to any aircraft store including a missile, a bomb, a radar system, an electronic warfare system, a telecommunication system or any other device attached to or disposed in an aircraft or other vehicle.

Figure 1B:
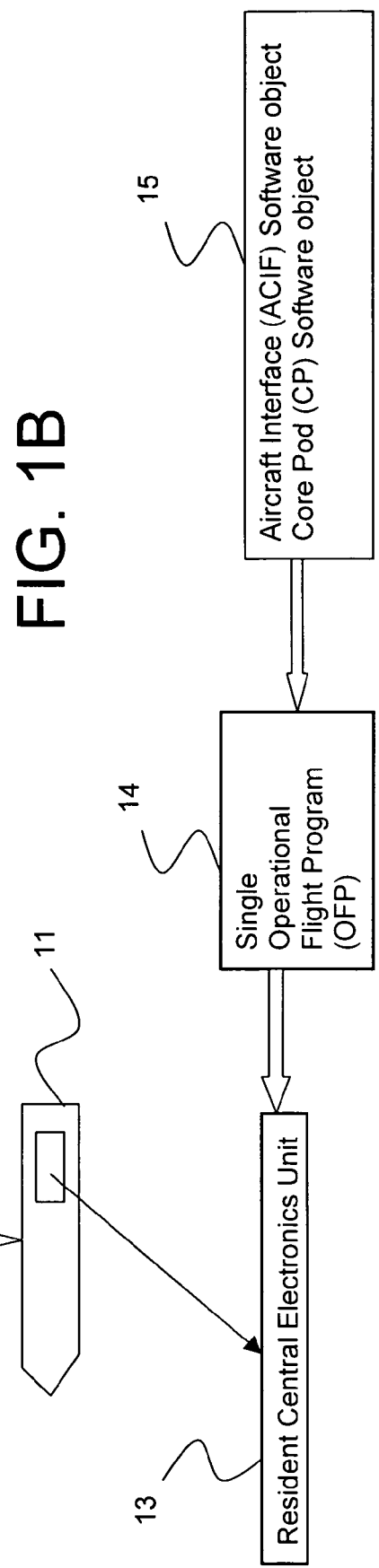
FIG. 1B is a block diagram of the functional architecture of a targeting pod utilizing the present invention.

Referring now to FIG. 1B, a block diagram of the hardware and software of the targeting pod 11 is provided. The targeting pod 11 includes a resident central electronics unit (CEU) 13 and a single operational flight program (OFP) 14. The OFP 14 comprises pod software 15 having an aircraft interface (ACIF) software object and a core pod (CP) object.

Figure 2:
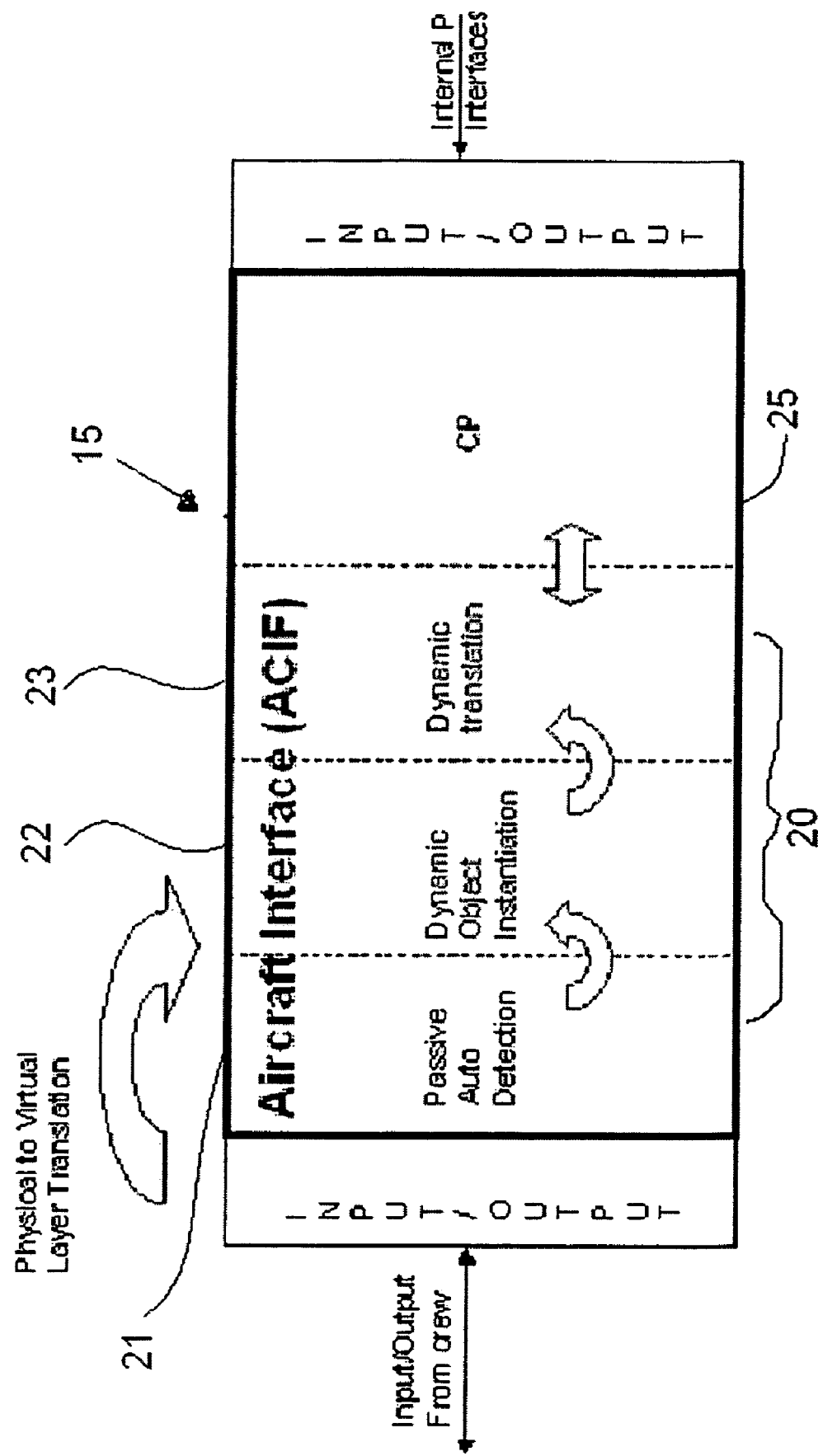
FIG. 2 is a block diagram of the targeting pod to aircraft interface of the present invention.

Referring now to FIG. 2, a block diagram illustrates the details of the pod software 15 including the ACIF software object 20 and the core pod object 25. The ACIF software object 20 preferably performs functions that are spread across three layers. These layers include a passive auto detection layer 21, a dynamic object instantiation layer 22, and a dynamic translation layer 23. The ACIF software object 20 receives input from the aircraft crew, performs the necessary interface unique functions and transmits messages to the core pod object 25. The core pod object 25 processes these messages and provides input to or receives output from the pod 11 via the internal pod interfaces.

Figure 3:
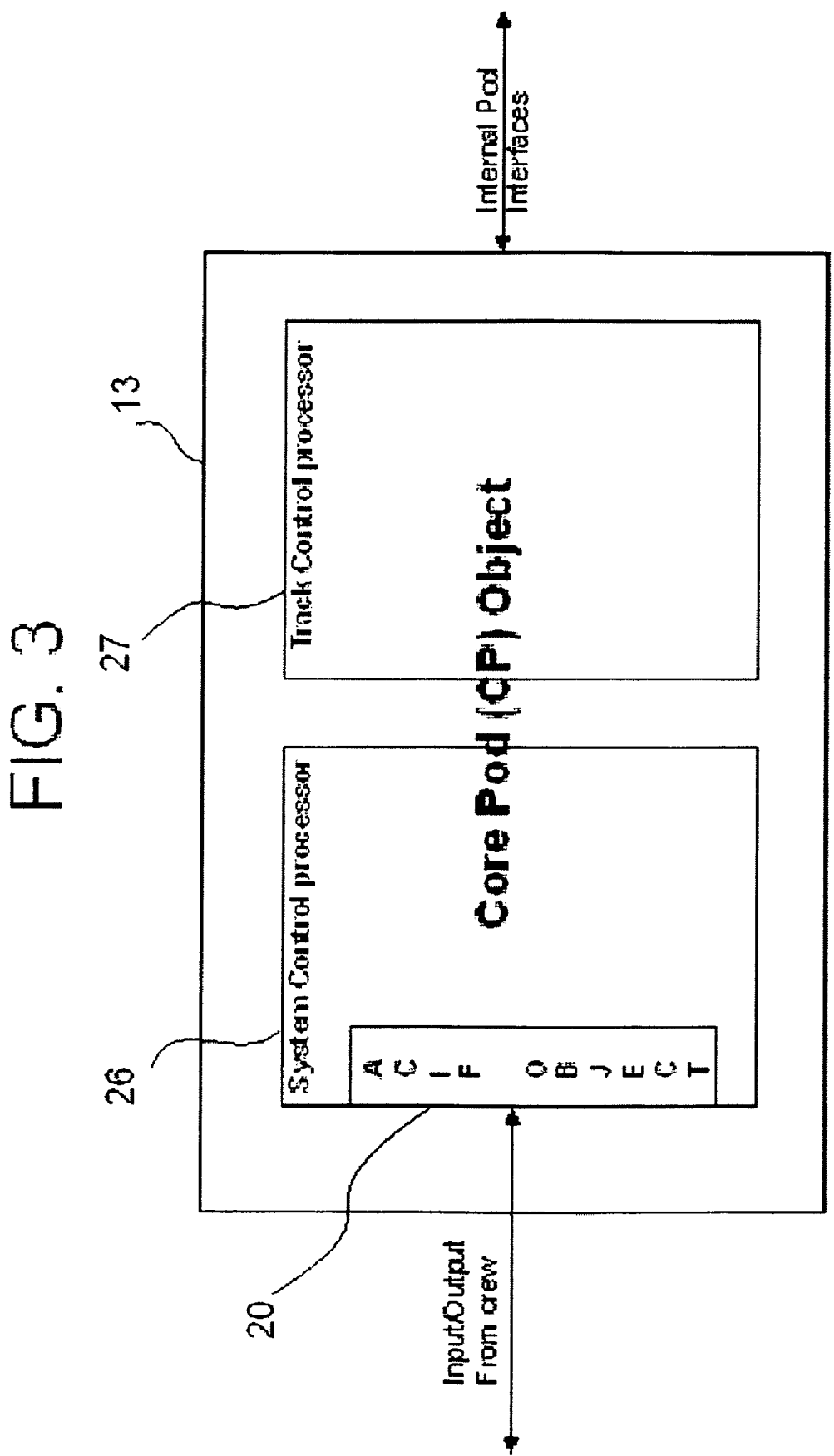
FIG. 3 is a block diagram of the pod to aircraft interface of the present invention.

Referring now to FIG. 3, a more detailed block diagram illustrates the CP object 25 as being embedded within two processors 26, 27 disposed within the CEU 13 of the pod 11. The system control processor 26 contains the ACIF object and a first portion of the CP object 25. The track control processor 27 contains a second portion of the CP object 27 and interfaces with the internal pod interfaces. The processors 26, 27 may be a single CPU or distributed among multiple processor configurations.

Figure 4:
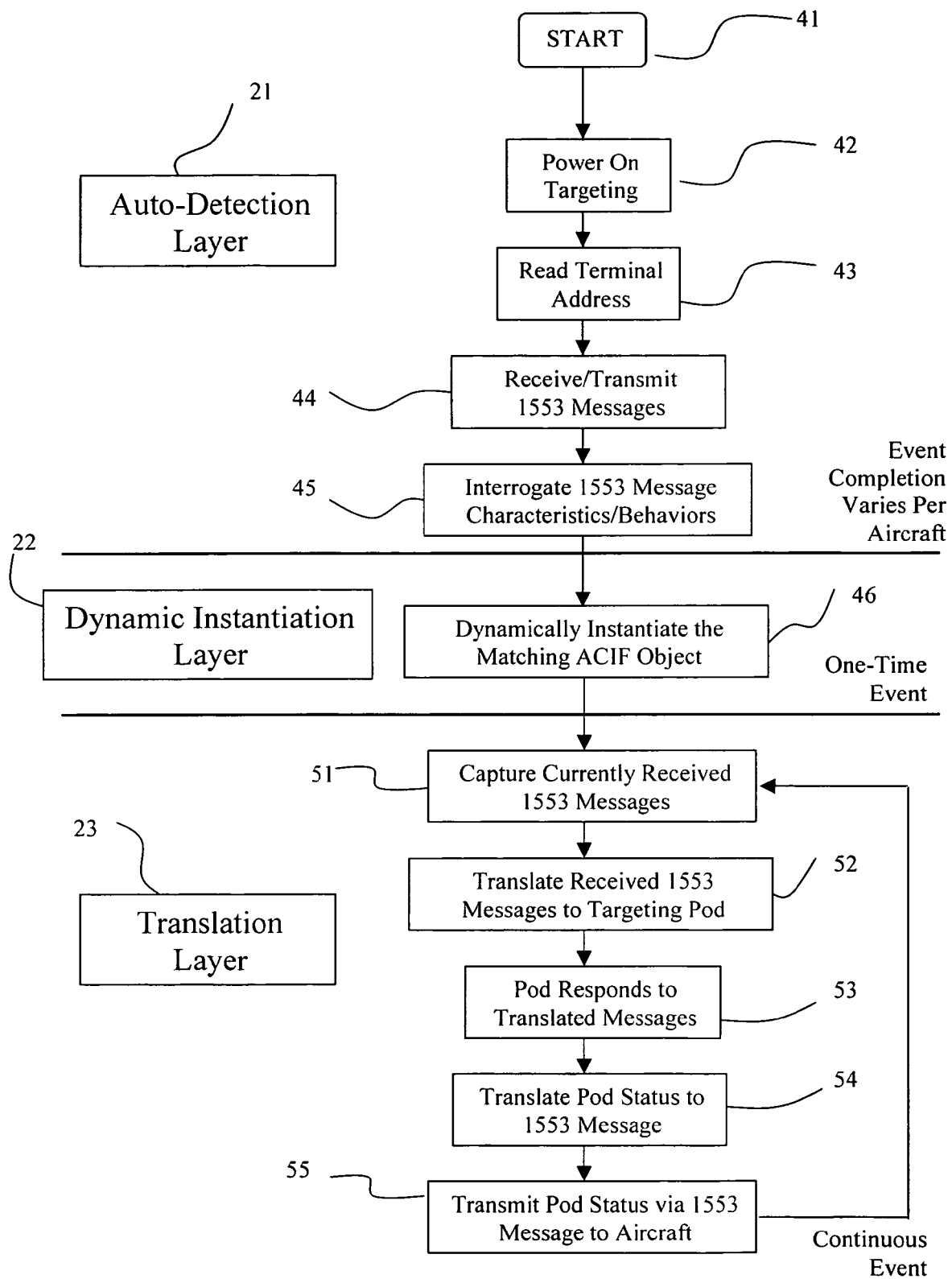
FIG. 4 is a flow diagram of the software associated with the present invention.

Referring now to FIG. 4, a flow chart illustrates the operation of the ACIF interface software object 20 and the core pod software object 25. This flowchart is described in the context of an exemplary 1553 physical interface. It should be noted that other physical interfaces could be used in place of the 1553 physical interface. The ACIF interface software object 20 provides a first auto-detection layer 21 which is initiated with the execution of the start step 41. In step 42, the targeting pod 11 is powered on. In step 43, the terminal address of the aircraft 10 is evaluated, and in step 44, 1553 messages are transmitted between the aircraft 10 and the targeting pod 11. In step 45, there is an interrogation of the 1553 message characteristics/behaviors which completes the auto-detection layer 21. The event completion within the auto-detection layer 21, however, will vary depending upon which type of aircraft 10 acts as the host.

In step 46, the software enters a dynamic instantiation layer 22 in which the matching ACIF object 20, corresponding to the host aircraft 10, is dynamically instantiated. In object technology, instantiate means to create an object of a specific class. This is essentially a one-time event.

In step 51, the software enters a translation layer 23, by capturing the currently received 1553 messages from the aircraft 10. In step 52, the received 1553 messages are translated to the targeting pod 11. In step 53, the targeting pod 11 responds to the translated messages. In step 54, the pod status is translated to a 1553 message. In step 55, the pod status is transmitted via a 1553 message to the aircraft 10. The steps 51-55 of the translation layer 23 are a continuous series of events which occur as long as the pod 11 is operational.

The auto detection interrogation scheme of the store or pod 11 dynamically determines the host aircraft type from a predetermined suite of host aircraft via 1553 multiplexer protocol or other protocol. The auto detection is accomplished without the use of jumpers or other non-1553 hardware components. The specific host aircraft 10 is determined by evaluating a predetermined suite of known terminal addresses and polling the 1553 mux traffic until a valid command/response is received from the mated host 10. The resultant host/terminal address pairing can then be validated by evaluating specific message protocol and characteristic. This validation step is necessary to prevent a potential host/terminal address pairing to a non-unique terminal address. Different host platforms may share a terminal address with existing stores. A predetermined timeout for each terminal address is preferably utilized to provide for sufficient response time. Once the host aircraft 10 is identified via valid communication, the specific host variant can be determined, if necessary. The store utilizes predetermined and unique interface protocol attributes possibly relating to message size and number of host sub-addresses to identify the correct host variant. Once auto detection is complete and has identified the mated host aircraft 10 and host variant, the ACIF object 20 is instantiated to provide specific translation between host aircraft 10 and store 11.

The architecture of aircraft interface software object 20 is designed to provide an encapsulated isolation layer comprising layers 21-23 so future and current aircraft platforms and interface variants can be configured and adapted into the software core baseline with minimal modifications. This encapsulation layer truly isolates and adapts the aircraft interface software object 20 from core pod functionality of CP object 25. The key features of the software architecture include the ability to auto detect aircraft platform and variant, the aircraft interface (AC IF) modularity, and the intelligent pod functional mapping.

The ability to auto detect aircraft platform and variant is a distinct and desirable feature. The use of C++ development software, however, provides the ability to encapsulate the auto-detected aircraft interface into an ACIF object 20 separate from the other pod control functions (core pod functionality) of the CP object 25 to provide a modular design. Therefore, using the power of object inheritance, two objects 20 and 25 are used to create the software interface between the aircraft 10 and the pod 11.

Figure 5:
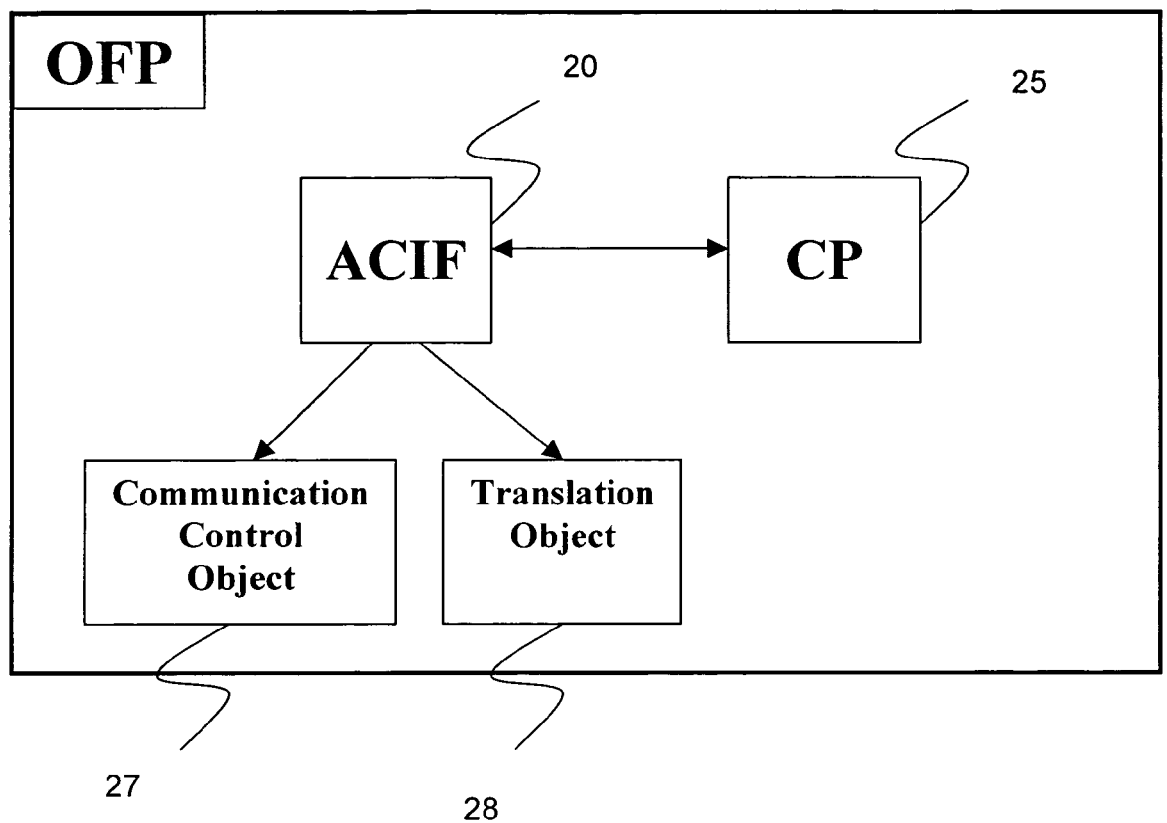
FIG. 5 is a block diagram of the OFP software.

Referring to FIG. 5, the ACIF object 20 preferably contains two objects consisting of a first communication control object 27 and a second translation object 28 The first ACIF object 27 inherits the properties of the aircraft interface object class (parent) and captures the incoming control computer data from the host aircraft 10. The second object 28 inherits the properties of the pod level commands object class (parent). This second object 28 translates the control computer data captured in the first object 27 into the functionally mapped pod software architecture to be used by the pod 11.

Figure 6:
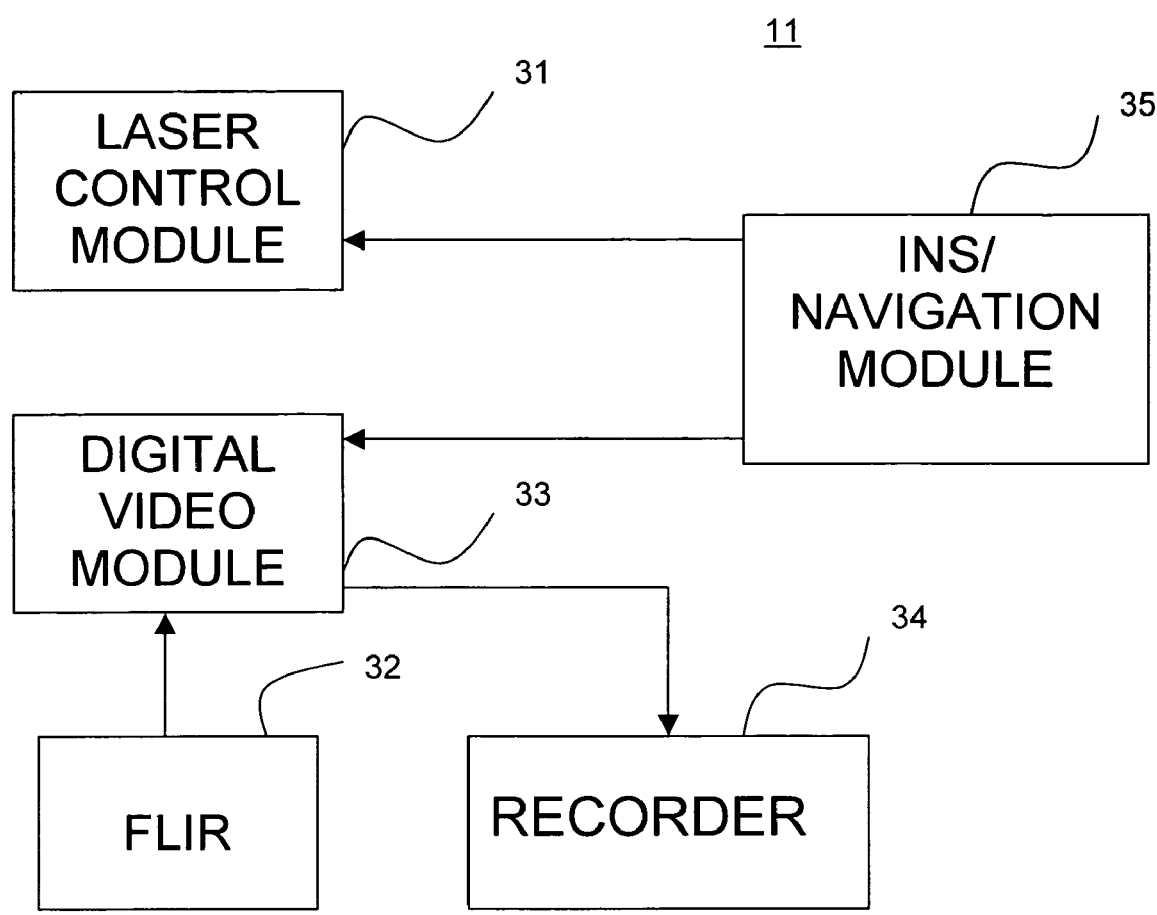
FIG. 6 is a simplified block diagram of a targeting pod.

Referring now to FIG. 6, a simplified block diagram illustrates the hardware of the pod 11. The pod. 11 may include a laser control module 31 for laser tracking and a FLIR sensor 32 for imaging. The FLIR sensor 32 is coupled to a digital video module 33 which processes the image data and preferably records it on a recorder 34. Both the laser module 31 and the digital video module 33 are coupled to an INS/navigation system 35.

The term "functionally mapped" means commanded data is translated to a subsystem software module. For example, INS data would be mapped to the INS/navigation module 35, laser data would be mapped to the laser control module 31. Pod functionality can also be increased or decreased without affecting the AC IF control layer because of this modularity.

Overall, the two part encapsulated modular aircraft interface of the present invention ensures the core pod control software has no direct interaction with the specific control computer of the aircraft 10. This architecture allows the present invention to operate on multiple platforms and variants with minimal or no core software modifications.

The present invention allows for highly efficient "asset pooling" of delivered assets. A single pod 11 with one software executable will configure and adapt automatically to all defined host aircraft platforms. A "common hardware adapter" may be required to adapt the pod 11 mounting surface to multiple bomb and wing rack mounting points on the aircraft 10. Moving an ATP targeting pod 11 from one aircraft host 10 to another, however, does not require reprogramming and can be accomplished by remounting to the second host aircraft 10 and powering up the pod 11. This entire operation should take less than fifteen minutes. This is a capability unique in the embedded targeting pod product suite and allows for a smaller number of assets to be shared among host platforms or aircraft 10 during deployment and training exercises.

The software associated with the present invention provides maximum host/variant encapsulation in the virtual space of the targeting pod 11. More specifically, hardware, except for common mounting is not needed for translation of messages between the aircraft 10 and the pod 11. The software of the present invention provides auto detection of host/variant for each pod application. Minimal modification of the software is necessary when the new hosts/variants are developed, since less than 5% of the total OFP is dedicated to aircraft interface software. When the core pod functionality is updated, there is a minimal impact to existing hosts/variants.

In addition to the ease of modifying the software of the present invention, certain characteristics are isolated to the host interface. For example, issues relating to PVI switchology, host INS/GPS characteristics, sub-address/message content are minimized as a result of host isolation. In addition, isolation facilitates pod functions related to multiplexer timing, units/scale, change requests, and symbology characteristics.

The ability to have one evolving OFP for all aircraft hosts and variants provides several advantages over the prior art. A single OFP minimizes customer cost to formally re-validate every change, and it maximizes the ability to quickly integrate new capabilities into user pod suite. Since the host interface suite is entirely located on one CPU, there is no global data connecting the host interfaces to pod functions. Since the ACIF class is object oriented and highly encapsulated, it provides strong virtual separation from core system functionality. Moreover, all core capabilities are retained for all hosts making it possible to interface the targeting pod with multiple hosts and variants.

We claim:

1. A method for interfacing communications between at least one of a weapons, targeting, or tracking platform, which is a host system, and at least one of a weapon, or a targeting or tracking unit, which is an associated store, the method comprising the steps of:
    auto-detecting the host system;
    instantiating an interface object for controlling communications with the host system that has been auto-detected, and for translating messages received from the host system, said interface object inherits the properties of the host system object class and the properties of the store level commands object class; and
    establishing communications between the associated store and the host system, wherein the host system and the associated store exchange information.

2. A method according to claim 1 wherein the interface object includes two interface objects, a first interface object for controlling communications with the host system, and a second interface object for translating messages received from the host system.

3. A method according to claim 2 wherein the host system is an aircraft.

4. A method according to claim 3 wherein the host aircraft includes a plurality of variants.

5. A method according to claim 4 wherein the associated store is a targeting pod.

6. A method according to claim 4 wherein the associated store is a weapon.

7. A method according to claim 1 wherein said interface object captures incoming control data from the host system.

8. A method according to claim 7 wherein the interface object translates the control data from the host system into a functionally mapped software architecture for the associated store.

9. A method for interfacing communications between a host aircraft and an associated store, comprising the steps of:
    auto-detecting the host aircraft;
    instantiating a first interface object to control communication with the host aircraft that has been auto-detected, said first interface object inherits the properties of the host aircraft object class and captures incoming control data from the host system;
    instantiating a second interface object for translating messages received from the host aircraft that has been auto-detected, said second interface object inherits the properties of the store level commands object class and translates the control data from the host system into a functionally mapped software architecture for the associated store; and
    establishing communications between the associated store and the host aircraft, wherein the host system and the associated store exchange information.

10. A method according to claim 9 wherein the associated store is a weapon or a targeting pod and the host aircraft includes a plurality of variants.

11. A method according to claim 10 which further includes the step of utilizing predetermined and unique interface protocol attributes relating to message size and type of host sub-addresses to identify a correct host variant.

12. At least one of a weapon, or a targeting or tracking unit, which is an associated store, that interfaces and communicates with at least one of a weapons, targeting, or tracking platform, which is a host system, the store comprising:
    at least a first processor that auto-detects the host system, instantiates a first interface object which controls communications with the host system and which inherits the properties of the host system object class, and instantiates a second interface object which translates messages received from the host system and inherits the properties of the store level commands object class; and
    at least one module that is responsive to the first processor and communicates with the host system.

13. An apparatus according to claim 12 wherein the host system is an aircraft.

14. An apparatus according to claim 13 wherein the host aircraft includes a plurality of variants.

15. An apparatus according to claim 14 wherein the associated store is a targeting pod.

16. An apparatus according to claim 15 wherein the targeting pod includes a FLIR, a digital video module and a recorder.

17. An apparatus according to claim 16 where the targeting pod further includes a laser control module and a navigation module.

18. An apparatus according to claim 14 wherein the associated store is a weapon.

19. An apparatus according to claim 12 wherein said first interface object captures incoming control data from the host system.

20. An apparatus according to claim 19 wherein the second interface object translates the control data from the host system into a functionally mapped software architecture for the associated store.

21. An apparatus for interfacing communications between a host aircraft and an associated store, the method comprising:
    an auto-detection unit that auto-detects the host aircraft;
    a first interface instantiation unit that instantiates a first interface object to control communication with the host aircraft that has been auto-detected, said first interface object inherits the properties of the host aircraft object class and captures incoming control data from the host aircraft;
    a second interface instantiation unit that instantiates a second interface object for translating messages received from the host aircraft that has been auto-detected, said second interface object inherits the properties of the store level commands object class and translates the control data from the host aircraft into a functionally mapped software architecture for the associated store; and
    an information exchange unit that exchanges information between the associated store and the host aircraft.

22. An apparatus according to claim 21 wherein the associated store is a targeting pod and the host aircraft includes a plurality of variants.

23. An apparatus according to claim 22 which further includes utilizing predetermined and unique interface protocol attributes relating to message size and type of host sub-addresses to identify a correct host variant.

24. An apparatus according to claim 23 wherein the targeting pod includes a FLIR, a digital video module and a recorder.

25. An apparatus according to claim 24 wherein the targeting pod further includes a laser module and an inertial navigation system module.

26. An apparatus according to claim 21 wherein the store is a weapon.

* * * * *